March 12, 1968 D. L. CARTER 3,373,414

AXIALLY AND RADIALLY AIR BEARING SUPPORT

Filed May 6, 1963 2 Sheets-Sheet 1

INVENTOR.
DONALD L. CARTER
BY George J. Netter

March 12, 1968 D. L. CARTER 3,373,414

AXIALLY AND RADIALLY AIR BEARING SUPPORT

Filed May 6, 1963 2 Sheets-Sheet 2

United States Patent Office 3,373,414
Patented Mar. 12, 1968

3,373,414
AXIALLY AND RADIALLY AIR BEARING SUPPORT
Donald L. Carter, Vestal, N.Y., assignor to International Business Machines Corporation, New York, N.Y., a corporation of New York
Filed May 6, 1963, Ser. No. 273,130
16 Claims. (Cl. 340—174.1)

The invention relates generally to a magnetic storage memory assembly for use with a computer, and more particularly to a magnetic drum memory.

In data processing equipment, such as computers, it is usual to provide one or more data storage units, one important general type of which is what is termed a magnetic drum memory. Information to be stored is transferred to and read from a drum, or cylindrically, shaped magnetic member through the instrumentality of magnetically operated transducing heads (reading and/or writing heads). It is inherent in the operation of magnetic drum memories that a slight space be maintained between the magnetic storage member and the heads, and access to the different portions of the magnetic storage member is achieved by a combination of rotating the member about its cylindrical axis and positioning the heads longitudinally along this axis.

Important to efficient operation of drum memories is the requirement to maintain the heads in a uniform, closely spaced arrangement (usually within several tenths of a thousandth of an inch) to the magnetic drum throughout reading and writing. This has been obtained in certain prior art devices by journaling the rotatable drum in high quality bearing races and fixedly securing the heads adjacent. Due to such things as eccentricities, warpage, creep, and the like, these devices have not been found to be fully satisfactory and certain other known drum memories maintain the continuous uniform spacing arrangement of the heads by supporting the heads on a film of air, or other gas, which is formed as a result of the rapid rotation of the drum cylinder past the heads.

Various problems are associated with drums having fluid mounted, or floated heads as they are sometimes called. First of all, there is the necessity for providing auxiliary means to hold the heads spaced from the recording surface during periods when the drum is at rest or rotating at a rate insufficient to generate a supporting film of air. If this is not done damage would result to the heads and/or recording surface. Additionally, further means are required to keep the mutual spacing arrangement of the heads and recording surface uniform throughout operation in order that consistent reading and writing is obtained. It is also implicit that failure of such head spacing devices can also result in inaccuracies of reading and writing and thereby can be considered to adversely affect the reliability of a drum memory as well as increase its cost.

It is therefore a primary object and purpose of the present invention to provide a magnetic drum memory in which reading and writing heads are at all times maintained in a non-contacting relation to the recording member.

Another object of the invention is the provision of such a drum memory having a complete gas bearing mounting for the rotatable member.

A further object of the invention is the provision of such a memory having a hysteresis impulse drive system.

A still further object of the invention is the provision of a drum memory in which the rotatable recording member is completely supported in all directions by a laminar fluid boundary during operation.

Another object is the provision in a drum memory of means for protecting the storage member during starting, stopping and quiescence.

A still further object of the present invention is to provide a drum memory of the type referred to in the above objects which is characterized by its low cost and extreme simplicity.

Briefly, the present invention provides a magnetic drum memory having a generally cylindrical recording member contained within a similarly shaped support housing. A hysteresis drive assembly included within the member serves to rotate it within the housing in a spaced relation to adjacent structures by means of gas laminar bearing action. Reading and writing heads are fixedly mounted within the supporting housing with mutual spacing of the heads and recording member being predetermined by the dimensions of the supporting structure relative to the recording member.

The foregoing and other objects, features and advantages of the invention will be apparent from the following more particular description of preferred embodiments of the invention, as illustrated in the accompanying drawings.

Figures 1, 2:
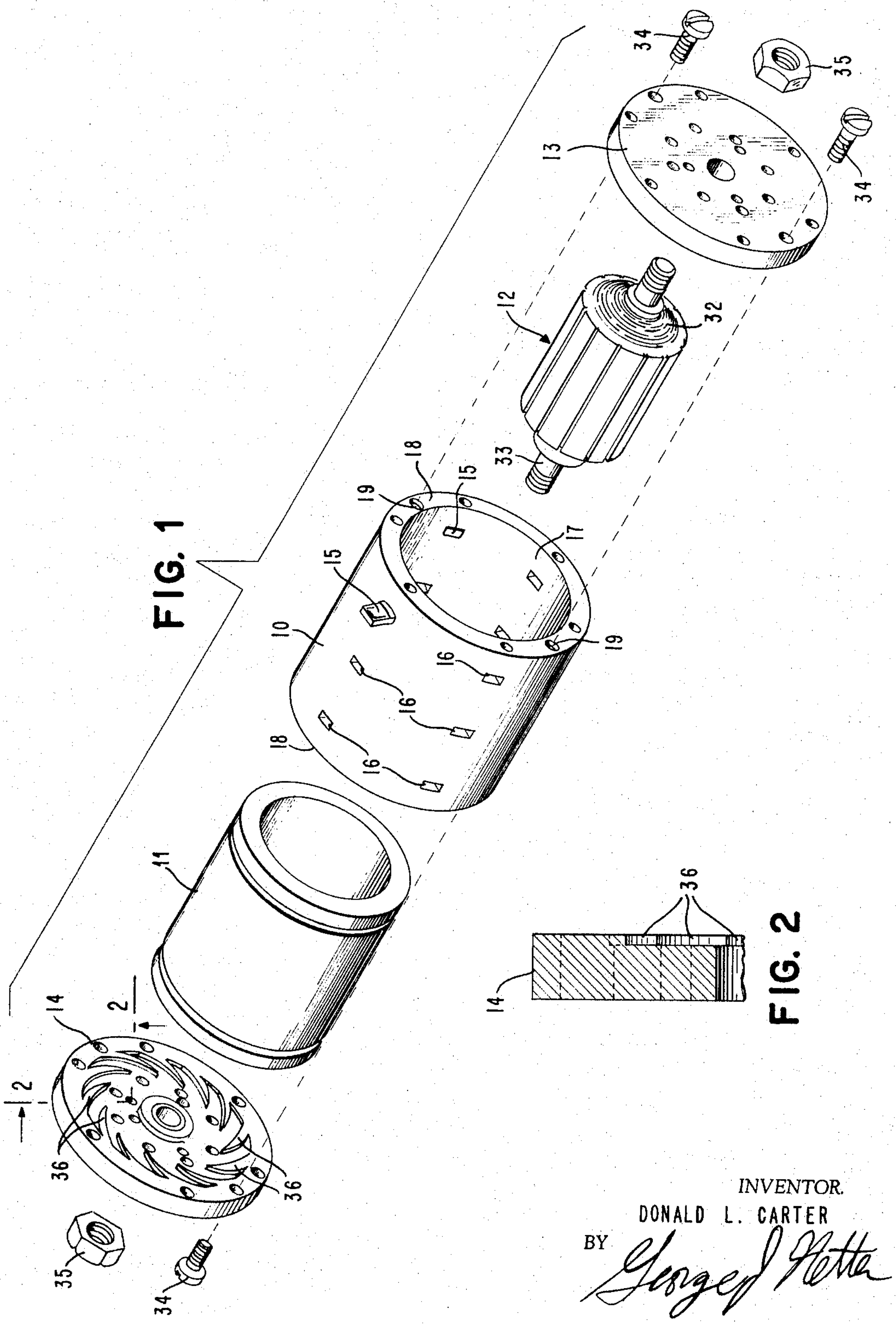
FIGURE 1 is an exploded view of the different component parts of a drum memory made in accordance with the practice of the invention.
FIGURE 2 is a sectional, fragmentary view of a part of the device shown in FIGURE 1 taken along the line 2—2.
Figure 3:
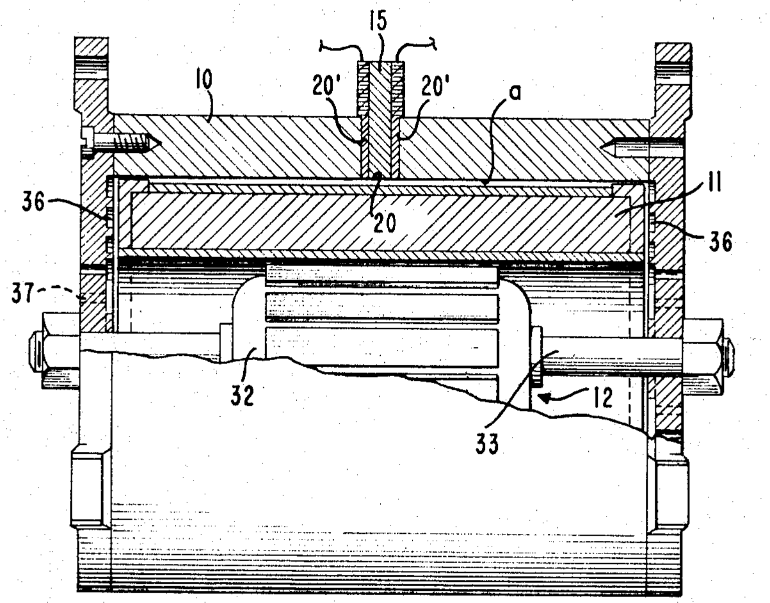
FIGURE 3 is a sectional, partly fragmentary view of the invention of FIGURE 1 in assembled condition.

With reference now to FIGURES 1 and 3, and particularly FIGURE 1, the magnetic drum memory of the invention is seen to comprise in its major elements a hollow cylindrical body 10, a similarly shaped recording member 11 for being received within the body 10, an impulse driving element 12 received within the recording member 11 and end plates 13 and 14 serving to enclose and maintain the entire assembly as an integral unit.

As particularly shown in FIGURE 2, the relative dimensions of the cavity of the body 10 and the general outer diameter of the recording member 11 are such that the member 11 can be included within the body in a very slightly spaced arrangement. When the member is set into rotative motion about its cylindrical axis the air, or other gas, disposed between the outer surface of the recording member and the inner opposed wall of the body 10 serves as a bearing. It is also a feature of this device that in addition to the radial fluid support of the recording member, a similar fluid bearing condition exists at the extremities of the member such that longitudinal spacing is obtained between the ends of the member 11 and the end plates 13 and 14. Accordingly, when the member 11 is brought up to full rotational speed through the influence of the driving element 12 a fluid boundary exists in full surrounding relation to the recording member leaving it supported throughout operation and thereby effecting an exceptionally low friction drive.

Magnetic transducing heads 15 for reading and/or writing information in connection with the recording member are received in appropriately shaped openings 16 of the body 10. The exact number and relative positions of the different heads are dependent upon the nature of use and number of information channels to be provided on the recording member.

In general assembled condition (FIGURE 3) it is contemplated that the recording member 11 is of such dimensions as to be able to be rotated by the electromagnetic action of the driving element 12 in a free non-contacting relation with respect to the driving element, body 10 or either of the end plates. In a way that will be brought out more clearly later, rotation of the member in such manner at a high rate of speed results in its floating on a cushion of air completely free of mechanical connection of any kind.

As to structural details of the body 10, it comprises a generally cylindrically shaped body constructed of a metallic material having good rigidity characteristics and being relatively non-magnetic. The inner surface 17 is accurately formed to permit rotation of the member 11 therein while maintaining a radial spacing between the two which is less than 0.001 of an inch. That is, the cavity of body 10 must be a true cylinder to within the required degree of accuracy and free from excessive ellipticity. The end walls 18 are faced to form single plane surfaces normal to the cylindrical axis of the body 10, and are provided with threaded openings 19 for a purpose that will be described later.

Also, as noted, a plurality of openings 16 are formed in the body 10 for receiving transducers 15. The operating portions, or faces, 20 are disposed and maintained coplanar with the surface 17 through the instrumentality of a suitable adhesive material or cement 20'. In actuality, the heads are initially cemented within the openings 16 with the faces 20 extending slightly into the cavity of the body 10. The inner surface 17 and operating faces 20 are then machined together as a unit so that the faces conform and are continuous with the inner surface of the body 10. Thus, the heads are an integral part of the body 10 in which they are fixedly mounted, and do not require auxiliary apparatus for positioning, but rather depend upon proper dimensions of the finished body 10 to obtain correct spacing relative to the member 11.

Figure 5:
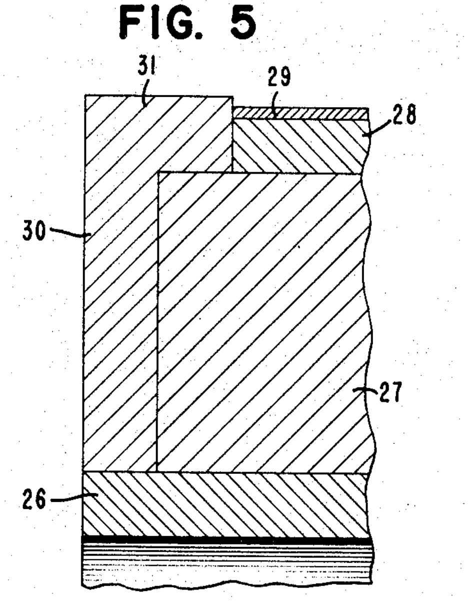
FIGURE 5 is another structural embodiment of a recording member.

The only moving part in the drum memory is the recording member 11 which is of a generally hollow cylinder geometry. It is important to note initially that each of the two illustrated embodiments of the member 11 in FIGURES 4 and 5 provide a recording medium, an air bearing cylindrical surface, air bearing thrust runners, a hysteresis motor rotor and wear resistant surfaces for protection of the recording medium during starting and stopping.

Figure 4:
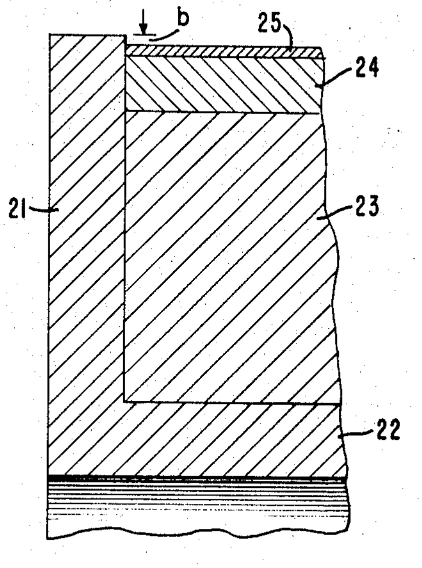
FIGURE 4 illustrates a greatly enlarged fragmentary portion of one form of recording member for practicing the invention.

As to the detailed structural aspects of the embodiment shown in FIGURE 4, it includes a pair of generally disc like collars 21 constructed of a material having the appropriate magnetic characteristics to make it suitable for use as a hysteresis impelled rotor. A satisfactory material for this purpose is cobalt steel which not only has a relatively high hysteresis loss, but also is hard and durable providing an important function that will be expanded upon later. Also, such a material should not have an adverse magnetic coaction with etiher the heads 15 or the recording medium.

These collars have hubs 22 which are pressed into a receiving cavity of a sleeve 23 of hollow cylindrical geometry, in a tight-fitting frictionally engaged relation. An excellent material for this sleeve is beryllium which combines the desirable properties of lightness of weight and of being relatively non-magnetic. Also, beryllium has a thermal coefficient of expansion closely approximating that of cobalt steel so that even relatively great changes in environmental temperature do not effect a loosening of the press fit of these parts.

A layer 24 of copper is plated onto the outer, or peripheral, portions of the sleeve 23. The layer is then machined to provide a cylinder of precise external dimensions substantially free from ellipticity. This layer serves as a substrate over and on which there is deposited by conventional electroplating techniques a coating 25 of a nickel-cobalt alloy, which coating acts as a magnetic storage medium in that localized portions can be set to specified magnetic states by controlling magnetic fields and these states will remain until they are affirmatively changed. Reading and writing of such magnetic states are accomplished by magnetic heads 15 previously described.

A second form or embodiment of the recording member 11 which can be advantageous particularly from the standpoint of ease of fabrication, is that illustrated in FIGURE 5. The overall construction is similar to the first-described embodiment of FIGURE 4 with the primary change being the details of the hysteresis runners or collars. More explicity, this embodiment of the recording member 11 comprises a hollow cylindrical base 26 over which there is provided a sleeve 27 of identical physical characteristics to the sleeve 23. As before, a layer 28 of copper is deposited over the sleeve 27 and finished to form a highly accurate cylinder substantially free of ellipticity. A film 29 of a magnetic material, such as a nickel-cobalt alloy, is provided over the copper layer to serve as the recording medium. As shown, the length and relative disposition of the sleeve 27 to the base 26 are such that the extremities of the sleeve lie inwardly of the extremities of the base. Similarly, the layer 28 and film 29 both terminate longitudinally inwardly of the extremities of the sleeve.

A pair of special collars 30 each having a generally disclike body and an inwardly directed hub 31 are provided of such dimensions as to be received over and onto the extended parts of the base 27. Also, the hub 31 of each collar fits over the protruding portion of the sleeve 27 and abuts against the extremity of the layer 28 and film 29. As before, the collars extend radially slightly beyond the outermost parts of the recording film to serve the protective purpose which is a primary object of the invention. Material requirements for the collars 30 are the same as for the collars 21.

It is important that the spacing *a*, c.f. FIGURE 3, between the heads 15 and the film 29 (or coating 25, as the case may be) be uniform and kept to a small dimension. Accordingly, this requires the dimension *b*, (c.f. FIGURE 4, for example) the radial difference between the outermost surface of the recording medium and the periphery of the collars, be commensurately small. Indicating the degree of size referred to, in an actual constructed embodiment of the invention the dimension *b* was 50 micro-inches (0.000050 inch). In this manner full protection is afforded the magnetic memory film or coating from either accidental physical contact during operation or contact that would normally be expected during starting or stopping, and this is accomplished without sacrificing the reading and writing advantages gained by maintaining the close spatial arrangement of the heads and memory medium.

Referring now again to FIGURE 1, with the recording member 11 contained within the cavity of the body 10 the impulse driving element 12 is located within the member 11. The element 12 is structurally similar to a motor, or generator, armature in that it has a plurality of windings, shown collectively at 32, centrally and fixedly disposed on a shaft 33. When fully mounted the end plates 13 and 14 are secured to the end faces 18 of the body 10 by threaded members 34 and have centrally aligned openings for receiving the ends of the shaft 33 therethrough. By means of nuts 35 the driving element is firmly secured to and held immovable with respect to the end plates and body 10. The relative dimensions and positioning of the element 12 in regard to the member 11 and body 10 are such that at no time can any part of the member 11 come into contact with either the windings 32 or shaft 33 of the driving element. Functionally, multiphase voltage from a suitable source (not shown) is applied to the windings to provide a rotating magnetic field about the element 12 with the shaft 33 as an axis. The field, in turn, induces corresponding electric currents in the collars 21, 27 which causes the collars and entire member 11 to rotate forming what is sometimes referred to as a "hysteresis"

motor. Exemplary of operations of a drum of this sort, in an actual run with six (6) watts of driving power a recording member was driven at 8000 revolutions per minute, which is well above normal present day requirements for drum memories.

Although no special surface treatment of either the magnetic recording medium or opposed inner surface 17 of the body 10 is necessary to effect an air bearing between these surfaces, special measures are needed to develop thrust air-bearing forces, that is, along directions parallel to the axis of the member 11. The particular means for achieving this are shown in various views in FIGURES 1, 2, 3 and 5, and are seen to comprise fluid shearing grooves 36 formed in a generally spiral arrangement symmetric about the center of each end plate and on the surfaces directed inwardly, or toward, the driving element 12. More specifically, the set of grooves on each end plate spiral in a common direction, which direction is such that the rotating member 11 turns into, or moves into, the convex portion of the grooves first. Thus, as shown in FIGURE 1 the correct motion of the member 11 with respect to the end plate 14 is counter clockwise as viewed into the end of the member closest to the viewer. As the collars 21, 30 of the member move rapidly past the grooves air is driven into the different grooves where a shearing action occurs resulting in an outward thrusting action of the air away from the end plates and exerted against the collars. In view of the highly symmetrical character of the end plates, collars on the member 11 and the body 10 substantially equal fluid thrust forces are generated at each collar serving to provide a fluid bearing at each end of the member. Air is supplied from the exterior to the interior of the drum memory via openings 37 in the plates.

In summary of operation, when no energization voltage is applied the recording member 11 is at rest, or, more exactly, the collars are in bearing contact with the lower inner surface 17 of the body 10. There also may be bearing contact of the collars and the inner face of one of the end plates, depending on the orientation of the device. Application of driving power causes the member 11 to begin to rotate and when it reaches a certain velocity, dependent on the physical features of the device, cushions of supporting air will be formed over the peripheral curved portions and end portions as previously described. Again, on slowing down when driving power is removed the supporting effect of the air films is reduced until the collars come into bearing contact with adjacent opposed surface areas of the body 10.

A drum memory constructed in accordange with the present invention possesses a number of advantages over known drum memories having conventional bearing journals for the rotating parts. The most obvious, and beneficial, is the considerable reduction in frictional drag afforded by the use of a complete air-bearing system. With this elimination of bearing drag there is a consequent reduction in electrical driving power requirement which is reflected by cooler operation and may in some cases be determinative of use where temperature restrictions are crucial.

A further incidental advantage of the invention is the elimination of problems associated with contamination from lubricants that were formerly used with conventional bearing races. Elimination of lubricants has permitted the increase in radiation resistance thereby increasing the area of environmental acceptance for the invention.

In providing a drum memory device that does not require means for lifting the heads from operative relation to the storage medium as is customary in certain known structures a substantial reduction in the number of moving parts is afforded with a concomitant improvement in reliability. This is particularly true in fabricating where the fewer number of parts means less chance of contamination during assembly.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a magnetic information storage assembly having a support body, a magnetic storage member within said support body, means for rotating the storage member relative to said body, the improvement comprising self-acting gas bearing means for axially and radially supporting the storage member in non-contacting relationship with respect to said support body during the rotation of said magnetic storage member.

2. A magnetic storage drum comprising:
a magnetic storage member;
a second member comprising a base having walls defining a cavity for receiving the storage member therein in enclosed relation;
drive means associated with the storage member for effecting rotation of the storage member relative to the base, said rotation of the storage member effecting a self-acting fluid bearing condition adjacent the peripheral portions thereof to support axially and radially the storage member in a spaced condition to said base.

3. A magnetic storage drum as in claim 2, wherein said drive means comprises a hysteresis impelling stator element disposed within the storage member, and said storage member further comprises a hysteresis rotor element operatively associated with said stator element.

4. A magnetic storage drum as in claim 2, in which said storage member comprises a generally cylindrical body having a magnetic layer on the major outer periphery and certain portions of said cylindrical body being of slightly larger diameter than the main body portion, said certain portions being constructed of a relatively hard durable material whereby the magnetic layer is held spaced from the base by said certain portions.

5. A magnetic memory drum, comprising:
an elongated hollow cylindrical support housing having open ends;
a hollow cylindrical magnetic recording member for being received within said housing in a slightly spaced manner;
hysteresis drive means disposed within the recording member for rotating the same;
end walls enclosing the cylindrical housing; and
wherein the relative spacing of the housing member and drive means with respect to the storage member are such that upon rotation of the member a film of air is formed over the peripheral portions thereof serving to form a complete self-acting air bearing mounting for radially supporting said recording member with resect to said elongated housing and for axially supporting said recording member with respect to said end walls during the rotation of said recording member.

6. A magnetic memory drum comprising:
an elongated hollow cylindrical support housing having open ends;
a hollow cylindrical magnetic recording member for being received within said housing in a slightly spaced manner;
hysteresis drive means disposed within the recording member for rotating the same;
end walls enclosing the cylindrical housing; and
wherein the relative spacing of the housing member and drive means with respect to the storage member are such that upon rotation of the member a film of air is formed over the peripheral portions thereof serving to form a complete self-acting air bearing mounting for the member, and wherein further the ends of said recording member are enlarged radially to provide a protection means against physical contact with the recording portions of the recording member during periods when the member is rotating at rates insufficient to generate the supporting air film.

7. A magnetic storage assembly, comprising:
magnetic storage body having an axis of symmetry;
a housing including a cavity of suitable dimensions for including the magnetic body therein in spaced relation to the walls defining the cavity;
multiphase field generating means mounted adjacent the magnetic body for inducing rotation of said body about its axis of symmetry;
bumper means associated with said magnetic body for preventing contact of said body with the walls of the housing defining the cavity; and self-acting gas bearing means for axially and radially supporting said body with respect to the walls of said housing during said rotation of said body.

8. A magnetic storage assembly as in claim 7, in which the body includes a cylindrical shell of a nicke-cobalt alloy.

9. A magnetic storage assembly, comprising:
a magnetic storage body having an axis of symmetry;
a housing including a cavity of suitable dimensions for including the magnetic body therein in spaced relation to the walls defining the cavity;
multiphase field generating means mounted adjacent the magnetic body for inducing rotation of said body about its axis of symmetry;
means restricting air flow into and out of the cavity; and
bumper means associated with said magnetic body for preventing contact of said body with either the walls of the housing defining the cavity or the restricting means, said bumper means including a plurality of disc-like collars of a hard durable material carried by the body, the dimensions of said collars exceeding the diametric dimensions of said body and having portions projecting outwardly and away from said body forming a protective measure against physical contact of the body and housing.

10. A magnetic storage assembly, comprising:
a housing including walls defining a cavity therein;
a magnetic storage member of dimensions less than the cavity and located within said cavity;
electromagnetic field inducing means mounted adjacent to and for causing said member to rotate within said cavity relative to the housing; and
in which the storage member includes a hollow non-magnetic cylindrical base, a cylindrical coating of magnetic material over said base serving as a storage medium, and disc-like members received over the ends of the base of diameters exceeding that of the base and coating serving to insure maintaining a spaced condition between the magnetic coating and the housing walls defining the cavity.

11. A magnetic storage assembly as in claim 10, in which the magnetic coating is a nickel-cobalt alloy and the disc-like members are constructed of cobalt steel.

12. A magnetic storage assembly as in claim 10, in which said disc-like members are each provided with hub-like portions that fit over and enclose portions of the extremities of the cylindrical base.

13. A magnetic storage assembly as in claim 10, in which the cavity in said housing is of open-end cylindrical geometry slightly larger than the base including magnetic coating and disc-like members; and
in which there is further provided end plates in covering relation to the open ends of the cavity, said plates including air shear-inducing grooves for generating thrust forces against the extremities of the base during rotation.

14. A magnetic storage assembly as in claim 10, which further comprises magnetic transducing heads immovably secured to the housing and magnetically associated with the recording coating.

15. A magnetic storage drum according to claim 2 further comprising solid bumper member means disposed between said magnetic storage member and said base member for preventing contact therebetween.

16. A magnetic storage assembly, comprising:
a housing member including walls defining a cavity therein;
a magnetic storage member of dimensions less than the cavity and located within said cavity, said storage member including a hollow non-magnetic cylindrical base, a cylindrical coating of magnetic material over said base serving as a storage medium;
means mounted adjacent to said storage member for causing said member to rotate within said cavity relative to the housing; and
solid bumper member means disposed between the housing walls defining the cavity and the storage member to insure maintaining a spaced condition between the magnetic coating and said housing walls.

References Cited

UNITED STATES PATENTS

| | | | |
|---|---|---|---|
| 2,602,632 | 7/1952 | Serduke et al. | 340—174.1 |
| 2,683,038 | 7/1954 | Saliba et al. | 179—100.2 |
| 2,854,298 | 9/1958 | Baumeister | 340—174.1 |
| 3,001,850 | 9/1961 | Marrs | 340—174.1 |
| 3,029,416 | 4/1962 | Quade | 340—174.1 |
| 3,063,041 | 11/1962 | Quade et al. | 340—174.1 |
| 3,134,969 | 5/1964 | Taft | 340—174.1 |
| 3,248,737 | 4/1966 | Thomas et al. | 179—100.2 |

BERNARD KONICK, *Primary Examiner.*

V. P. CANNEY, *Assistant Examiner.*